United States Patent [19]

Hodakowski et al.

[11] 4,100,046
[45] Jul. 11, 1978

[54] RADIATION POLYMERIZABLE CYCLOALKENYL DERIVATIVES OF ACRYLATED EPOXIDIZED FATTY OILS OR FATTY ACIDS

[75] Inventors: Leonard Edward Hodakowski, St. Albans; Claiborn Lee Osborn, Charleston, both of W. Va.

[73] Assignee: Union Carbide Corporation, New York, N.Y.

[21] Appl. No.: 635,150

[22] Filed: Nov. 25, 1975

[51] Int. Cl.$^2$ ............................. C08F 2/46; C08F 4/00
[52] U.S. Cl. ............................. 204/159.23; 204/159.14; 204/159.15; 204/159.16; 260/23.7 R; 260/23.7 C; 260/836; 427/54; 204/159.19; 560/120; 560/128
[58] Field of Search ............ 204/159.14, 159.15, 204/159.16, 159.23; 260/23 EP, 468 G, 468 Q, 23.7 R, 23.7 C

[56] References Cited

U.S. PATENT DOCUMENTS

| | | | |
|---|---|---|---|
| 3,050,478 | 8/1962 | Radlove | 260/18 |
| 3,125,592 | 3/1964 | Nevin | 260/405 |
| 3,215,757 | 11/1965 | Sheibli et al. | 260/837 |
| 3,674,893 | 7/1972 | Nowak et al. | 260/836 |
| 3,931,075 | 1/1976 | Trecker et al. | 260/23 EP |

*Primary Examiner*—Richard B. Purer
*Attorney, Agent, or Firm*—Francis M. Fazio

[57] ABSTRACT

Polymerizable reaction product mixtures containing cycloalkenylcarbonyloxy compounds are produced by the reaction of a conjugated diene with (i) an acrylate or methacrylate ester of an expoxidized long chain unsaturated fatty oil or (ii) an acrylate or methacrylate of an epoxidized long chain unsaturated fatty acid or ester thereof. The reaction product mixtures obtained are useful per se and in formulations as inks or coatings that can be cured by exposure to radiation or heat.

13 Claims, No Drawings

RADIATION POLYMERIZABLE CYCLOALKENYL DERIVATIVES OF ACRYLATED EPOXIDIZED FATTY OILS OR FATTY ACIDS

BACKGROUND OF THE INVENTION

Over the past few years an extensive amount of literature has been published relating to compositions that are useful as coatings and inks that are essentially free of nonreactive volatile solvents. There have been extensive efforts made to produce such compositions because of their non-polluting properties and their economic advantages. Many of these compositions can be cured by radiation means, while many are cured by thermal or a combination of thermal and radiation means. These compositions have become known as 100 percent total solids compositions because of the essential absence of the volatile solvents in the formulations, even though they may be liquid in character.

SUMMARY OF THE INVENTION

The instant invention is directed to polymerizable reaction product mixtures containing cycloalkenylcarbonyloxy compounds comprising the reaction product mixture of a conjugated diene with an acrylate ester of an epoxidized long chain unsaturated fatty acid or ester thereof or an acrylate ester of an epoxidized long chain unsaturated fatty oil, all as hereinafter defined. These polymerizable compositions are produced by reacting the conjugated diene and the acrylate ester as hereinafter described.

DESCRIPTION OF THE INVENTION

The compositions of this invention are the reaction product mixtures obtained by the reaction of the defined conjugated dienes with the defined acrylates or methacrylates. These reaction product mixtures can be used as obtained as an ink composition or as a coating composition, or they can be formulated with other components. When so used, the conventional additives, known to those skilled in the art, can be incorporated; such as pigments, dyes, stabilizers, antistats, fungicides, bactericides, photoinitiators, photosensitizers, activators, and the like. These additives are introduced in the conventional manner and in the conventional amounts and their identities, modes of addition and amounts used are well known to those skilled in the art and require no further elaboration herein. One can also, if desired, incorporate solvents; however, the incorporation of a solvent in any appreciable quantity would then destroy the "100 percent solids" character of the composition. The polymerizable reaction product mixtures can be cured or dried by non-ionizing or ionizing radiation, or by thermal means, or a combination thereof. Typical non-ionizing radiation means are ultraviolet radiation procedures employing low, medium, or high pressure mercury lamps, many of which are commercially available; further, this technology is regularly employed.

The vicinal acryloxy hydroxyl long chain fatty acids, fatty esters and fatty oil compounds, and polymers thereof, are well known and have been disclosed in U.S. Pat. No. 3,125,592 (Mar. 17, 1964), 3,224,989 (Dec. 21, 1965) and 3,256,225 (June 4, 1966). These compounds, also known as acrylate or methacrylate esters of epoxidized long chain unsaturated fatty acids or esters thereof and acrylate or methacrylate esters of long chain unsaturated fatty oils, are generally prepared by the reaction of the epoxidized derivative of the long chain unsaturated fatty acid or ester thereof or the epoxidized derivative of the fatty oil with a vinylated compound such as acrylic acid or methacrylic acid, as shown in the patents. They have been found useful in the production of many other intermediates. They have also been found of use in the production of radiation curable coating and ink compositions. However, in some applications, the coatings and ink compositions containing these derivatives did not possess sufficiently acceptable properties or a sufficiently rapid rate of cure. It has, therefore, been considered desirable to modify them to obtain modified compositions having more desirable properties. This has now been accomplished with many of the compositions of this invention, which are reaction product mixtures containing the novel cycloalkenylcarbonyloxy compounds herein described.

The novel polymerizable compositions of this invention are the reaction product mixtures obtained. The term reaction product mixture as used herein is the polymerizable reaction product mixture containing the cycloalkenylcarbonyloxy compounds as it is obtained upon the completion of the reaction. When the reaction involves the use of a starting material containing more than one acryloxy or methacryloxy group, it is generally a composite of many individual compounds and, because of its complex nature, it has been difficult or impossible to isolate the individual components therein and identify each. Regardless thereof, and total reaction product mixture produced can be used and this is the novel polymerizable reaction product of this invention. This reaction product mixture is said to be a polymerizable reaction product mixture containing cycloalkenylcarbonyloxy compounds because compounds produced during the reaction contain the cycloalkenylcarbonyloxy group, as hereinafter defined. The reaction product mixture is polymerizable when exposed to radiation or heat.

The term "cycloalkenylcarbonyloxy" define the unsubstituted or substituted cyclohexenylcarbonyloxy group:

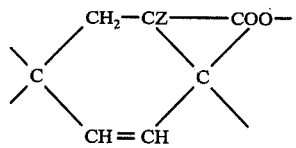

or the unsubstituted or substituted bicyclo [2.2.1] hept 2 en-5-carbonyloxy group:

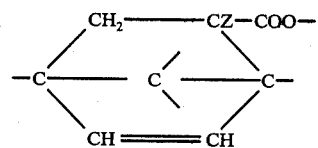

wherein Z is hydrogen or methyl and wherein the free valence bonds shown on the carbon atoms of the above formulas are any substituent which will not adversely interfere with the reaction, such as hydrogen atoms, halogen atoms (chlorine, bromine, fluorine, iodine), unsubstituted or substituted alkyl groups of 1 to 6 carbon atoms, phenyl groups, carboxyl group, and the like. This cycloalkenylcarbonyloxy group is attached to the molecule via the free valence bond of the carbonyloxy group.

As previously indicated, the acrylate and methacrylate esters of the epoxidized long chain unsaturated fatty oils and of the epoxidized long chain unsaturated fatty acids and their esters are known compounds. Those suitable for use as starting materials for reaction with the conjugated dienes are those acrylate and methacrylate esters of the epoxidized long chain unsaturated fatty acids or esters thereof wherein the aliphatic chain has from 10 to 24 carbon atoms and at least one oxirane group, or of the epoxidized long chain unsaturated fatty oils wherein the esterified aliphatic acid chains have from 10 to 24 carbon atoms and wherein at least one of said esterified chains contains an oxirane group. The number of oxirane groups in the molecule will vary and can be as high as four or more. These acrylate and methacrylate ester compounds are well known, with many of them being commercially available. Included are the acrylate and methacrylate esters of epoxidized fatty oils such as epoxidized soybean oil, epoxidized corn oil, epoxidized castor oil, epoxidized cottonseed oil, epoxidized hempseed oil, epoxidized tall oil, epoxidized safflower oil, epoxidized peanut oil, epoxidized linseed oil, epoxidized olive oil, epoxidized cod oil, epoxidized herring oil, epoxidized menhaden oil, etc; the acrylate and methacrylate esters of epoxidized unsaturated long chain fatty acids or of the corresponding esters of the said epoxidized unsaturated long chain fatty acids such as the methyl or ethyl or butyl or decyl esters of 9,10-epoxystearic acid, the propyl or 2-ethylhexyl esters of 9,10,12,13-diepoxystearic acid, the phenyl ester of 5,6-epoxycapric acid, 9,10-epoxyricinoleic acid, 9,10-epoxypentacosic acid, 4,5-epoxydecyl-1-acetate, 9,10-epoxystearyl stearate, 9,10-epoxy-1-phenoxyoctadecane, 9,10-epoxystearic acid, 4,4-epoxydecanoic acid, 9,10-epoxy-octa-decanoic acid 9,10-epoxytetracosanoic acid, 8,9-epoxy-1-hydroxydecanoic acid, 9,10-epoxy-1-hydroxyoctadecanoic acid, 9,10-epoxy-tetracosanoic acid, 4,5-epoxy-1-chlorodecanoic acid, 9,10-epoxy-1-bromooctadecanoic acid, 9,10-epoxy-1-chlorotetracosanoic acid, 4,5-epoxy-1-nitrilodecanoic acid, 4,5-epoxy-1-aminododecanoic acid, 9,10-epoxy-1-methylaminooctadecanoic acid, 4,5-epoxy-1-carbamyl-decanoic acid, 9,10-epoxycapric acid, 9,10-epoxyoctadecyl-1-propionate, as well as the linear or branched alkyl or phenyl esters of the above epoxidized fatty acids and the like.

Reaction of the acrylic acid or methacrylic acid with the oxirane ring of the epoxidized compound results in opening of the oxirane ring and formation of a vicinal hydroxyl acryloxy group, as shown by the following equation:

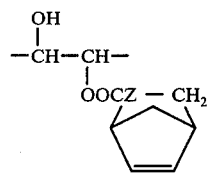

Subsequently, reaction of this vicinal hydroxyl acryloxy moiety with the conjugated diene, e.g. cyclopentadiene results in the formation of the cycloalkenylcarbonyloxy group, e.g.

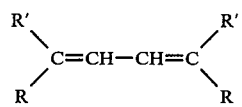

The conjugated dienes suitable for reaction with the hereinbefore described acrylate and methacrylate esters of epoxidized long chain unsaturated fatty oils or fatty acids or esters thereof, are those of the formula:

$$\begin{array}{c}R' \\ \diagdown \\ R \end{array} C=CH-CH=C \begin{array}{c} R' \\ \diagup \\ R \end{array}$$

wherein each R and R', separately, can be hydrogen, halogen, unsubstituted or substituted (linear or branched) alkyl of 1 to 6 carbon atoms, unsubstituted or substituted phenyl, carboxyl, or other inert group; and the two Rs taken together can be an unsubstituted or substituted lower divalent alkylene group having up to about 4 carbon atoms. Illustrative of suitable conjugated dienes are butadiene, hexadiene-2,4-phenylbutadiene, tolylbutadiene, 1,4-di-phenylbutadiene, chlorobutadiene, sorbic acid, cis-piperylene, 1,3-octadiene, 1,3-nonadiene, 1,3-decadiene, 1,3-heptadiene, cyclopentadiene, dichlorocyclopentadiene, hexachlorocyclopentadiene, methylcyclopentadiene, dimethylcyclopentadiene, hexamentylcyclopentadiene, bromocyclo-pentadiene, fluorocyclopentadiene, iodocyclo-pentadiene, tetraphenylcyclopentadienone, diphenylcyclopentadienone, cyclopentadienone, hexafluorocyclopentadiene, tetrafluorocyclopentadienone, tetrabromocyclopentadienone, tetraiodocyclo-pentadienone, and the like.

As previously indicated, the polymerizable reaction product mixtures containing the cycloalkenylcarbonyloxy compounds are produced by reaction of the conjugated diene with the defined acrylate and methacrylate esters of epoxidized long chain unsaturated fatty oils or fatty acids or esters thereof. The amount of conjugated diene used can vary up to an equivalent amount thereof per equivalent of vicinal hydroxyl acryloxy groups present in the reaction mixture since as previously shown, one equivalent of conjugated diene will react with one equivalent of unsaturation present in said vicinal hydroxyl acryloxy group. However, if complete reaction is required an excess can be charged. Thus, from 0.1 to 1.2 equivalent of conjugated diene, preferably from 0.1 to 0.4 equivalent thereof, per equivalent vicinal hydroxyl acryloxy group is charged to the reaction mixture.

The reaction is carried out at a temperature of from 0° to 80° C., preferably from 25° to 40° C. The time required will, of course, also vary depending upon the size of the batch and the particular reactants being charged, a fact well known in the chemical industry. In a typical reaction, a catalyst is also present to catalyze the reaction and, if desired, an inhibitor is also used to preclude excessive polymerization. Typical catalysts are known to those skilled in the art and include, for example, aluminum chloride, stannic chloride, boron trifluoride, ferric chloride, titanium tetrachloride, aluminum chloride etherate, and the like.

Typical inhibitors include phenothiazine, hydroquinone, monomethyl ether of hydroquinone, 2,6-di-t-butyl-p-cresol, and other known hindered phenol inhibitors.

The manner or order of addition of the reactants to the reaction mixture in the reactor can be varied. Generally the vicinal hydroxyl acryloxy compound is initially charged to the reactor together with the catalyst and inhibitor and the conjugated diene is added thereto. In most instances the reaction occurs immediately; however, stirring is preferably continued for a short time after addition of the conjugated diene has been completed.

The preferred polymerizable epoxide-modified reaction product mixtures are those having minimal amount of free residual vinylated carboxylic acid therein, generally less than about 3% by weight of the total composition.

The polymerizable reaction product mixture of this invention are generally liquid materials that can be used per se or in formulated compositions as inks or coatings. They are cured to a non-tacky form by radiation means, ionizing or non-ionizing, or by thermal cure. The liquid reaction product mixtures produced have viscosities of from about 500 to 5,000 poises, preferably from 500 to 1,000 poises. When they are to be cured by non-ionizing or light radiation means, photosensitizers or photoinitiators are added thereto. These are generally present at concentrations of from 0.1 to 10 weight percent of the composition to be cured, preferably from 0.5 to 5 weight percent. Any of the known photoinitiators can be used and illustrative thereof one can mention 2,2-diethoxyacetophenone, 2,2-dimethoxy-2-phenylacetophenone, 2,2-dimethoxyacetophenone, 2,2-dibutoxyacetophenone, 2,2-dihexoxyacetophenone, 2,2-di(2-ethylhexoxy)acetophenone, 2,2-diphenoxyacetophenone, 2,2-ditolyloxyacetophenone, 2,2-di(chlorophenyl)acetophenone, 2,2-di(nitrophenyl)acetophenone, 2,2-diphenoxy-2-phenylacetophenone, 2,2-dimethoxy-2-methylacetophenone, 2,2-di-sec-butoxyacetophenone, 2-phenylacetophenone, 2,2-dimethoxy-2-methylacetophenone, 2,2-dipropoxy-2-hexylacetophenone, 2,2-diphenoxy-2-ethylacetophenone, 2,2-dimethoxy-2-cyclopentylacetophenone, 2,2-dipentoxy-2-cyclohexylacetophenone, 2,2-di(2-ethylhexyl)-2-cyclopentylacetophenone, 2,2-diphenoxy-2-cyclopentylacetophenone, 2,2-di(nitrophenoxy)-2-cyclohexylacetophenone, 2- or 3-chlorothioxanthone, xanthone, thioxanthone, acetophenone, propiophenone, benzophenone, fluorenone, benzaldehyde, fluorene, anthraquinone, triphenylamine, carbazole, 2- or 3- or 4-methylacetophenone, 2- or 3- or 4-methoxyacetophenone, 2- or 3- or 4-bromoacetophenone, 3- or 4-allylacetophenone, 2,2,2-trichloro-4'-t-butylacetophenone, 3,3'- or 3,4'- or 4,4'-dimethoxybenzophenone, 4-chloro-4'-benzyl-benzophenone, 3- or 9- dichloroxanthone, 2- or 3-chloroxanthone, 3-chloro-8-nonylxanthane, 3-methoxyxanthone, 3-iodoxanthone, 2-acetyl-4-methylphenyl acetate, benzoin, the alkyl and aryl ethers of benzoin, 1,3-diphenylacetone, and any of the other known photoinitiators can be used in an amount sufficient to photoinitiate the reaction.

It has also been known that an activator can be used in conjunction with the photoinitiator and that in some instances a synergistic effect is observed. These activators are employed at concentrations of from 0.1 to 10 weight percent, preferably from 0.5 to 5 weight percent, of the total composition. Illustrative thereof one can mention methylamine, diisopropylamine, tributylamine, decylamine, tri-2-chloroethylamine, ethanolamine, triethanolamine, methyldiethanolamine, 2-aminoethylethanolamine, allylamine, cyclohexylamine, cyclopentadienylamine, diphenylamine, ditolylamine, trixylamine, tribenzylamine, N-cyclohexylethyleneimine, piperidine, 2-methylpiperidine, N-ethylpiperidine, 1,2-3,4-tetrahydropyridine, 2- or 3- or 4-picoline, morpholine, N-methylmorpholine, piperazine, N-methylpiperazine, 2.2-dimethyl-1,3-bis[3-(N-morpholinyl)-propionyloxy]propane, 1,5-bis[3-(N-morpholinyl)propionyloxy] diethyl ether, and any of the other known activators. One can use a single photoinitiator and a single activator, or one can use mixtures of two or more of either or both.

The polymerizable reaction product mixtures containing the cycloalkenylcarbonyloxy compounds can be used to prepare formulations with other oligomers, polymers, or monomers in the production of formulated compositions. Indicative of monomers that can be used in preparing the formulations one can mention those containing at least one acrylyl or methacrylyl group in the molecule. Illustrative thereof are acrylic acid, acrylamide, methyl acrylate, ethyl acrylate, hexyl acrylate, 2-ethylhexyl acrylate, butoxyethoxyethyl acrylate, neopentyl glycol diacrylate, bicyclo[2.2.1]-hept-2-yl acrylate, dicyclopentenyl acrylate, pentaerythritol mono- or di- or triacrylate or mixtures thereof, isodecyl acrylate, trimethylopropane mono- or di- or triacrylate or mixtures thereof, 2-phenoxyethyl acrylate, glycidyl acrylate, 2-ethoxyethyl acrylate, 2-methoxyethyl acrylate, 2-(N,N-diethylamine)ethyl acrylate, omegamethoxyethyl (hendecaoxyethylene) acrylate, omegatridecoxyethyl-(hendecaoxyethylene) acrylate, trimethoxyallyloxymethyl acrylate, bicyclo[2.2.1]hept-2-en-5-ylmethyl acrylate, ethylene glycol diacrylate, bicyclo[2.2.1]hept-2-en-5,6-diyl diacrylate, vinyl acrylate, 2-hydroxypropyl acrylate, 2-hydroxyethyl acrylate, acrylated epoxidized soybean oil, acrylated epoxidized linseed oil, (methyl carbamyl)ethyl acrylate, the reaction product of an aromatic or aliphatic polyisocyanate (such as tolylene diisocyanate) with a hydroxyalkyl acrylate (such as 2-hydroxyethyl acrylate or 2-hydroxypropyl acrylate). The acrylyl compounds are well known and the above discussion is only illustrative; any photocurable compound containing the acrylyl group is suitable for use. Suitable methacrylyl compounds are the methacrylates of the above-identified acrylates.

Any other polymerizable monomer containing at least one polymerizable ethylenically unsaturated group of the structure $>C=C<$ can also be used, and illustrated thereof one can mention the nitriles such as acrylonitrile and methacrylonitrile; the olefins such as dodecene, styrene, 4-methylstyrene, alpha-methylstyrene, cyclopentadiene, dicyclopentadiene, butadiene, 1,4-hexadiene, 4-methyl-1-pentene, bicyclo[2.2.1]hept-2-ene, bicyclo[2.2.1]hept-2,5-diene, cyclohexene; the vinyl halides such as vinyl chloride, vinylidene chloride; the vinyl esters such as vinyl acetate, vinyl butyrate, vinyl benzoate, vinyl butyral, vinyl methacrylate, vinyl crotonate; the vinyl ketones such as vinyl methyl ketone, vinyl phenyl ketone, isopropenyl methyl ketone, divinyl ketone, alpha-chloro-vinyl methyl ketone, vinyl phenyl ketone; acrolein and methacrolein; the vinyl ethers and thioethers such as methyl vinyl ether, ethyl vinyl ether, divinyl ether, isopropyl vinyl ether, the butyl vinyl ethers, 2-ethylhexyl vinyl ether, vinyl 2-chloroethyl ether, vinyl 2-methoxyethyl ether, n-hexadecyl vinyl ether, vinyl methyl sulfide, vinyl ethyl sulfide, divinyl sulfide, 1-chloroethyl vinyl sulfide, vinyl octadecyl sulfide, vinyl 2-ethoxyethyl sulfide, vinyl phenyl sulfide, diallyl sulfide; the miscellaneous sulfur and nitrogen containing monomers such as divinyl sulfone, vinyl ethyl sulfone, vinyl sulfonic acid, vinyl ethyl sulfoxide, sodium vinyl sulfonate, vinyl sulfonamide, vinyl pyridine, N-vinyl pyrollidone, N-vinyl carbazole. Other photocurable monomers are readily apparent to one skilled in the art.

The specific monomers mentioned are illustrative only and not all-inclusive. They can be used individually with the reaction product mixtures of this invention or two or more thereof can be employed dependent upon the desires of the individual. The preferred monomers and oligomers are the acrylyl compounds.

As previously indicated formulations of our polymerizable reaction product mixtures containing the cycloalkenylcarbonyloxy compounds can also be made by blending with other polymers. Among the polymers that can be used one can include, for example, the polyolefins, and modified polyolefins, the vinyl polymers, the polyethers, the polyesters, the polylactones, the polyamides, the polyurethanes, the polyureas, the polysiloxanes, the polysulfides, the polysulfones, the polyformaldehydes, the phenolformaldehyde polymers, the natural and modified natural polymers, the heterocyclic polymers.

The term polymer as used herein includes the homopolymers and copolymers and includes the olefin polymers and copolymers such as polyethylene, poly(ethylene/propylene), poly-(ethylene/norbornadiene), poly(ethylene/vinyl acetate), poly(ethylene/vinyl chloride), poly(ethylene/ethyl acrylate), poly(ethylene/acrylonitrile), poly(ethylene/acrylic acid), poly(ethylene/styrene), poly(ethylene/vinyl ethyl ether), poly(ethylene/vinyl methyl ketone), polybutadiene, poly(butadiene/styrene/acrylonitrile), poly(vinylchloride), poly(vinylidene chloride), poly(vinyl acetate), poly(vinyl methyl ether), poly(vinyl methyl ketone), poly(allyl alcohol), poly(vinylpyrrolidone, poly(vinyl butyral), polystyrene, poly(N-vinyl-carbazole), poly(acrylic acid), poly(methyl acrylate), poly(ethyl acrylate), polyacrylonitrile, polyacrylamide, poly(methacrylic acid), poly(methyl methacrylate), poly(ethyl methacrylate), poly(N,N-dimethyl acrylamide), poly(methacrylamide), polycaprolactone, polycaprolactone/vinyl chloride), poly(ethylene glycol terephthalate), poly(caprolactam), poly(ethylene oxide), poly(propylene oxide), copolymers of ethylene oxide and propylene oxide with starters containing reactive hydrogen atoms such as the mixed copolymer using ethylene glycol or diethylene glycol or glycerol or sucrose, etc., as starter, the natural and modified natural polymers such as gutta percha, cellulose, methyl cellulose, starch, silk, wool, and the siloxane polymers and copolymers, the polysulfides and polysulfones, the formaldehyde polymers such as polyformaldehyde, formaldehyde resins such as phenol-formaldehyde, melamineformaldehyde, urea-formaldehyde, aniline-formaldehyde and acetone-formaldehyde.

Also useful are the low molecular weight urethane oligomers containing free reactive acrylyl or methacrylyl groups such as are disclosed for example, in U.S. Pat. No. 3,509,234 and German Offenlegungsschrift No. 2103870.0.

The polymers can be used individually with the polymerizable reaction product mixtures containing the cycloalkenylcarbonyloxy compounds of this invention, or two or more thereof can be utilized. One can also employ combinations of monomers, oligomers and polymers in conjunction with the polymerizable reaction product mixtures containing the cycloalkenylcarbonyloxy compounds in producing the formulations.

When formulations are produced, the amount of polymerizable reaction product mixture containing the cycloalkenylcarbonyloxy compounds of this invention present therein can vary from 1 to 99.9 weight percent, preferably from 10 to 40 weight percent of the total composition. Any of the inks or coatings containing the polymerizable reaction product mixture containing the cycloalkenylcarbonyloxy compounds of this invention can also contain pigments or colorants, antistats, dyes, stabilizers, fungicides, bactericides, photoinitiators, photosensitizers, activators, and other conventional additives in the known conventional amounts.

The compositions or formulated compositions of this invention can be applied to a substrate for use as a coating or for use as a printing ink. After application they can be cured by exposure to electron beam radiation or ultraviolet light radiation. The methods of cure are well known to those skilled in the art and a detailed explanation is not necessary here. One particularly satisfactory process for curing is that described and claimed in U.S. Pat. No. 3,840,448 (issued Oct. 8, 1974), incorporated herein by reference.

The following examples serve to further illustrate the invention.

EXAMPLE 1

A reaction flask equipped with a stirrer, thermometer, dropping funnel and dry ice condenser was charged with 55 grams of the acrylated epoxidized linseed oil having an average of 2.5 acrylyl groups per 1,000 molecular weight units and 200 ml. of benzene. A solution of 5.45 grams of cyclopentadiene in 30 ml. of benzene was added in a dropwise manner over 15 minutes. In this instance, aluminum chloride was not present and the reaction mixture was stirred for two hours after completion of the addition of the cyclopentadiene solution and then the benzene was removed by distillation. The polymerizable reaction product mixture containing the cycloalkenylcarbonyloxy compounds that was produced had a light yellow color.

To a 5 gram portion of the above reaction product of Example 1, there was added 0.25 gram of benzophenone. The composition was applied to a steel panel using a number 20 wire wound rod and cured to a hard dry film by exposure for about 6 seconds to ultraviolet light radiation emanating from three 2.2 kilowatt medium pressure mercury lamps and having a total flux of about 500 watts per square foot.

EXAMPLE 2

To the equipment described in Example 1, there was charged a solution of 50 grams of the same acrylate derivative of epoxidized linseed oil and 200 ml. of benzene. To this there was slowly added 10 grams of aluminum chloride as catalyst and then over a 15-minute period a solution of 20.5 grams of hexachlorocyclopentadiene in 30 ml. of benzene was added; immediate reaction occurred without any indication of a temperature rise. The mixture was stirred for one hour, filtered and distilled to remove the benzene. The polymerizable reaction product mixture containing the cycloalkenylcarbonyloxy compounds that was produced was dark in color.

A curable composition was produced containing 5 grams of the above reaction product of Example 2, 5 grams of neopentyl glycol diacrylate, 3.3 grams of hydroxyethyl acrylate, 3.3 grams of 2-ethylhexyl acrylate, and 0.15 gram of 2,2-diethoxyacetophenone. The composition was coated on a steel panel and cured by an initial exposure for 1.5 seconds to the same ultraviolet light radiation described in Example 1 followed by exposure under nitrogen for 1.8 seconds to ultraviolet light radiation of 2,537 Angstroms emanating from 35 watts low pressure mercury lamps having a total flux of 0.0376 watts per cm.

A second curable composition was prepared containing 5 grams of the above reaction product of Example 2, 10 grams of pentaerythritol triacrylate and 0.04 gram of 2,2-diethoxyacetophenone, applied to a steel panel and cured to a hard dry film in the same manner described above after an exposure of 0.5 second to the medium pressure mercury lamp radiation and 0.6 second to the 2,537 Angstroms radiation.

EXAMPLE 3

In a manner similar to that described in Example 1 a solution of 20.5 grams of hexachlorocyclopentadiene in 30 ml. of benzene was added to a solution of 50 grams of the acrylate derivative of epoxidized linseed oil in 200 ml. of benzene. The reaction mixture was then stirred for an additional two hours and distilled to remove the benzene. The polymerizable reaction product mixture containing the cycloalkenylcarbonyloxy compounds that was produced was clear and there was no indication of darkening.

A curable composition was produced containing 5 grams of the above reaction product of Example 3 and 0.25 gram of benzophenone. It was applied to a steel panel and cured to a dry film as described in Example 1 using an exposure time of about 3 seconds.

EXAMPLE 4

In a manner similar to that described in Example 1, a solution of 40 grams of pentaerythritol polyacrylate having an average acrylyl group content of 3.2 in 200 ml. of benzene was reacted with a solution of 40 grams of cyclopentadiene in 40 ml. of benzene. The reaction mixture was heated at 70° C. for two hours, stirred overnight at room temperature and distilled to remove the benzene. The polymerizable reaction product mixture containing the cycloalkenylcarbonyloxy compounds was a liquid.

A curable composition was produced containing 5 grams of the reaction product of Example 4 and 0.25 gram of 2,2-diethoxyacetophenone. It was applied to a steel panel and cured to a dry film as described in Example 1 using an exposure time of about 6 seconds.

A second curable composition was produced containing 10 grams of the reaction product of Example 4, 10 grams of neopentyl glycol diacrylate, 6.7 grams of hydroxyethyl acrylate, 6.7 grams of 2-ethylhexyl acrylate and 0.33 gram of 2,2-diethoxyacetophenone. It was applied to a steel panel and cured to a dry film in the same manner described in Example 2.

Another curable composition was produced containing 5 grams of the reaction product of Example 4, 2 grams of pentaerythritol triacrylate, 0.3 grams of benzophenone and 0.05 gram of Michler's ketone. It was applied to a steel panel and cured to a dry film in the same manner described in Example 2, radiation for half the time produced a tacky film.

EXAMPLE 5

To a reactor equipped with stirrer, thermometer, reflux condenser and sparging tube there were charged 200 grams of the epoxide of soya bean oil having an average oxirane content of 7 weight percent and 20 grams of 2-(3,4-epoxycyclohexyl)-5,5-spiro(3,4-epoxycyclohexane)-m-dioxane. To the stirred mixture there was added 0.85 gram of triphenyl phosphine and after stirring under nitrogen at 80° C. for 1 hour, the purge was changed to air and 48.2 grams of acrylic acid, 0.86 gram of potassium acetate, 0.049 gram of the monomethyl ether of hydroquinone and 10 grams of bis-2,2-(4'-hydroxyphenyl) propane were added and the mixture stirred at 110° to 120° C. for about 5 hours and then overnight at room temperature. The following day the contents of the reactor was heated to 80° C., 13.2 grams of cyclopentadiene were added and the reaction continued at 80° to 90° C. for about 3 hours. The modified polymerizable reaction product mixture containing the cycloalkenylcarbonyloxy compound produced was a liquid.

A curable composition was produced containing 10 grams of the reaction product of Example 5, 5 grams of neopentyl glycol diacrylate, 2.5 grams of 2-hydroxyethyl acrylate, 2.5 grams of 2-ethylhexyl acrylate and 0.2 gram of 2,2-diethoxyacetophenone. The composition was applied to steel panels and cured by the procedure described in Example 2. A first panel was cured by initial exposure to medium pressure mercury lamp ultraviolet radiation for about 3 seconds followed by exposure for about 3.6 seconds to radiation of 2,537 Angstroms. A second panel was cured by initial exposure to the ultraviolet radiation for 0.6 second followed by radiation of 2,537 Angstroms for 0.7 second. In both instances, dry, hard, satisfactory films were produced.

EXAMPLE 6

To a reactor similar to that described in Example 5 there were charged 200 grams of the same epoxide of soya bean oil, and 20 grams of 2-(3,4-epoxy)-cyclohexyl-5,5-spiro(3,4-epoxy)cyclohexane-m-dioxane. To the stirred mixture there was added 0.85 gram of triphenyl phosphine at room temperature and after stirring under nitrogen at 80° C. for 1 hour, the purge was changed to air and 48.2 grams of acrylic acid, 0.86 gram of potassium acetate and 0.049 gram of the monomethyl ether of hydroquinone were added. The reaction mixture was stirred at 110° to 120° C. for about 5 hours and stirred overnight at room temperature. The following day the mixture was heated to 85° C., 15 grams of cyclopentadiene were added and the reaction mixture was stirred at 80° to 90° C. for about 4 hours. The modified polymerizable reaction product mixture containing the cycloalkenylcarbonyloxy compound produced was a liquid.

A curable composition was produced containing 10 grams of the reaction product of Example 6, 5 grams of neopentyl glycol diacrylate, 2.5 gram of hydroxyethyl acrylate, 2.5 grams of 2-ethylhexyl acrylate and 0.2 gram of 2,2-diethoxyacetophenone. The composition was applied to steel panels and when they were cured by the two procedures shown for Example 5, dry, hard, satisfactory films were produced.

What is claimed is:

1. A polymerizable composition containing compounds having in the molecule the cycloalkenylcarbonyloxy group of the structural formula:

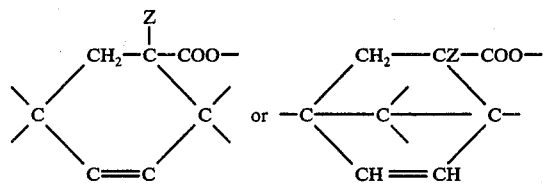

wherein Z is hydrogen or methyl and wherein said cycloalkenylcarbonyloxy group is attached to the molecule via the free valence bond of the carbonyloxy group thereof, said composition being the reaction product of (A) an unsubstituted or substituted conjugated diene with (B) an acrylate or methacrylate ester of an epoxidized long chain unsaturated fatty oil, fatty acid or ester thereof, wherein the ratio of said diene charged per equivalent vicinal hydroxyl acryloxy group charged is from 0.1:1 to 1.2:1.

2. A polymerizable composition as claimed in claim 1, wherein the ratio of diene charged per equivalent vicinal hydroxyl acryloxy group charged is from 0.1:1 to 0.4:1.

3. A polymerizable composition as claimed in claim 1, wherein (A) is of the general formula:

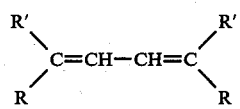

wherein each R and R', taken separately, is a member of the group of hydrogen, halogen, alkyl of from 1 to 6 carbon atoms, phenyl or carboxyl.

4. A polymerizable composition as claimed in claim 1, wherein (B) is an acrylate ester of an epoxidized long chain unsaturated fatty oil having from 10 to 24 carbon atoms in the aliphatic chains thereof and wherein at least one of said chains contains an oxirane group.

5. A polymerizable composition as claimed in claim 1, wherein (B) is an acrylate ester of an epoxidized long chain unsaturated fatty acid or ester thereof having from 10 to 24 carbon atoms in the aliphatic chain and at least one oxirane group.

6. A polymerizable composition as claimed in claim 1, wherein (A) is cyclopentadiene.

7. A polymerizable composition as claimed in claim 1, wherein (A) is hexachlorocyclopentadiene.

8. A polymerizable composition as claimed in claim 1, wherein (B) is the acrylate ester of epoxidized linseed oil.

9. A polymerizable composition as claimed in claim 1, wherein (B) is the acrylate ester of epoxidized soybean oil.

10. A polymerizable composition as claimed in claim 1, wherein a pigment is additionally present.

11. A polymerizable composition as claimed in claim 10, wherein a photoinitiator is additionally present.

12. A polymerizable composition as claimed in claim 1, wherein a photoinitiator is additionally present.

13. A polymerizable composition as claimed in claim 1, wherein the cycloalkenylcarbonyloxy compounds mixture is a blend with another oligomer, polymer or monomer.

* * * * *